July 5, 1932.  G. RAYMOND  1,865,788
CONVEYER SYSTEM
Filed June 22, 1928    4 Sheets-Sheet 1

INVENTOR.
Gwynne Raymond
BY
Thorpe & Thorpe    ATTORNEYS.

July 5, 1932.  G. RAYMOND  1,865,788
CONVEYER SYSTEM
Filed June 22, 1928   4 Sheets-Sheet 2
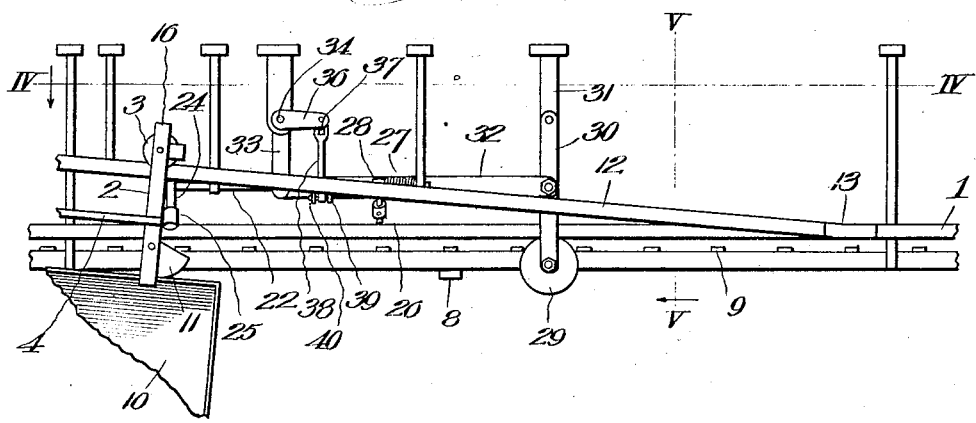
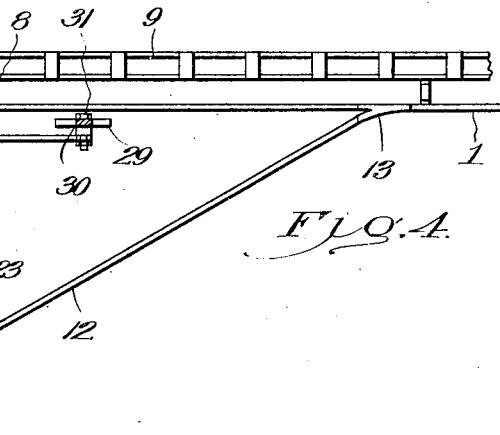
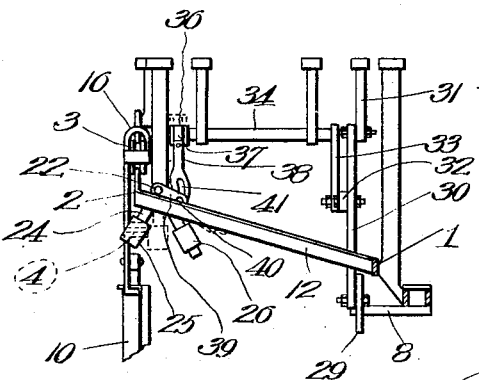
INVENTOR.
Gwynne Raymond
BY
Thorpe & Thorpe  ATTORNEYS.

July 5, 1932.   G. RAYMOND   1,865,788
CONVEYER SYSTEM
Filed June 22, 1928   4 Sheets-Sheet 3
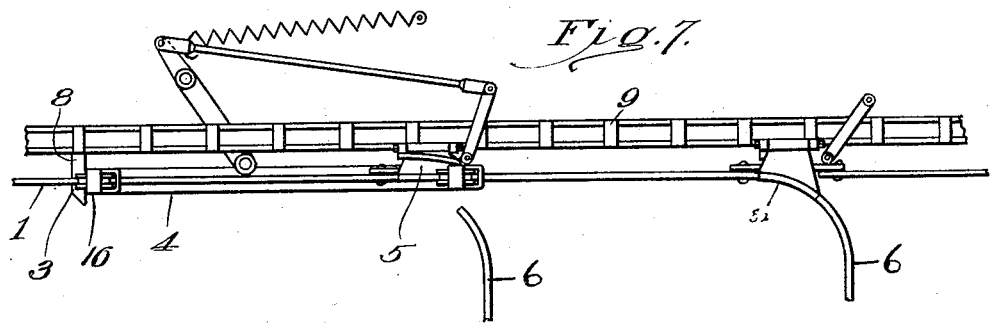
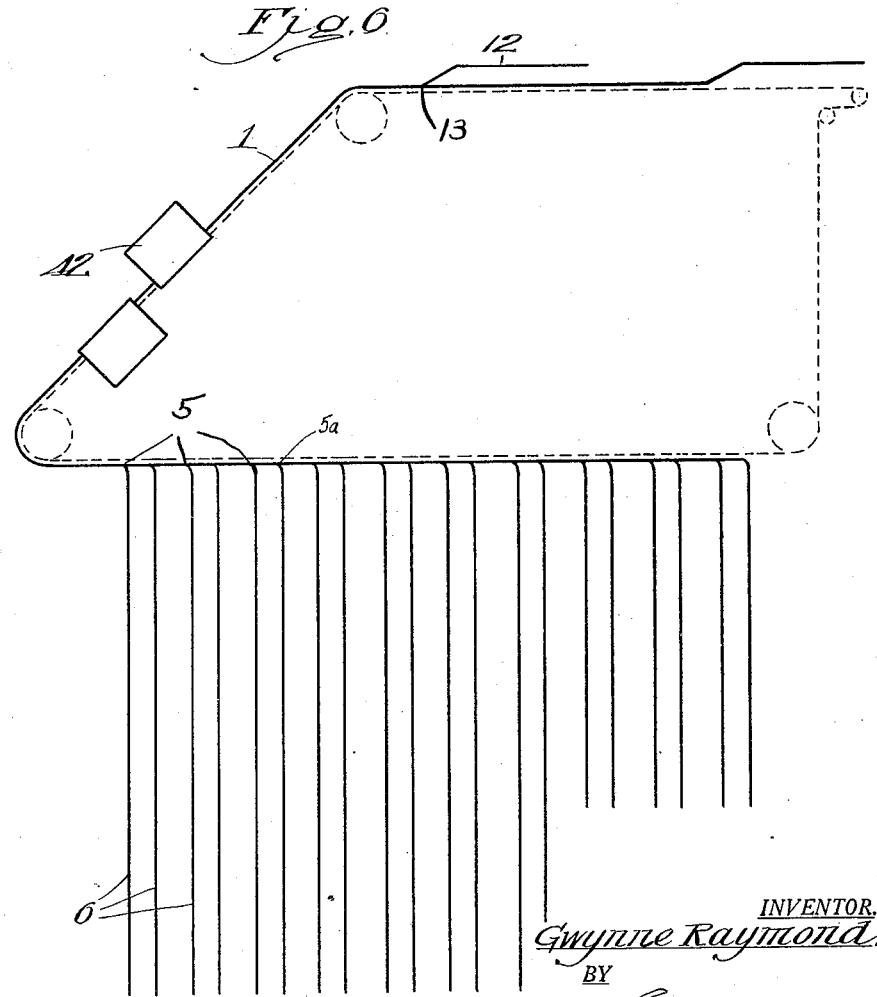
INVENTOR.
Gwynne Raymond.
BY
Rosser Thorpe   ATTORNEYS.

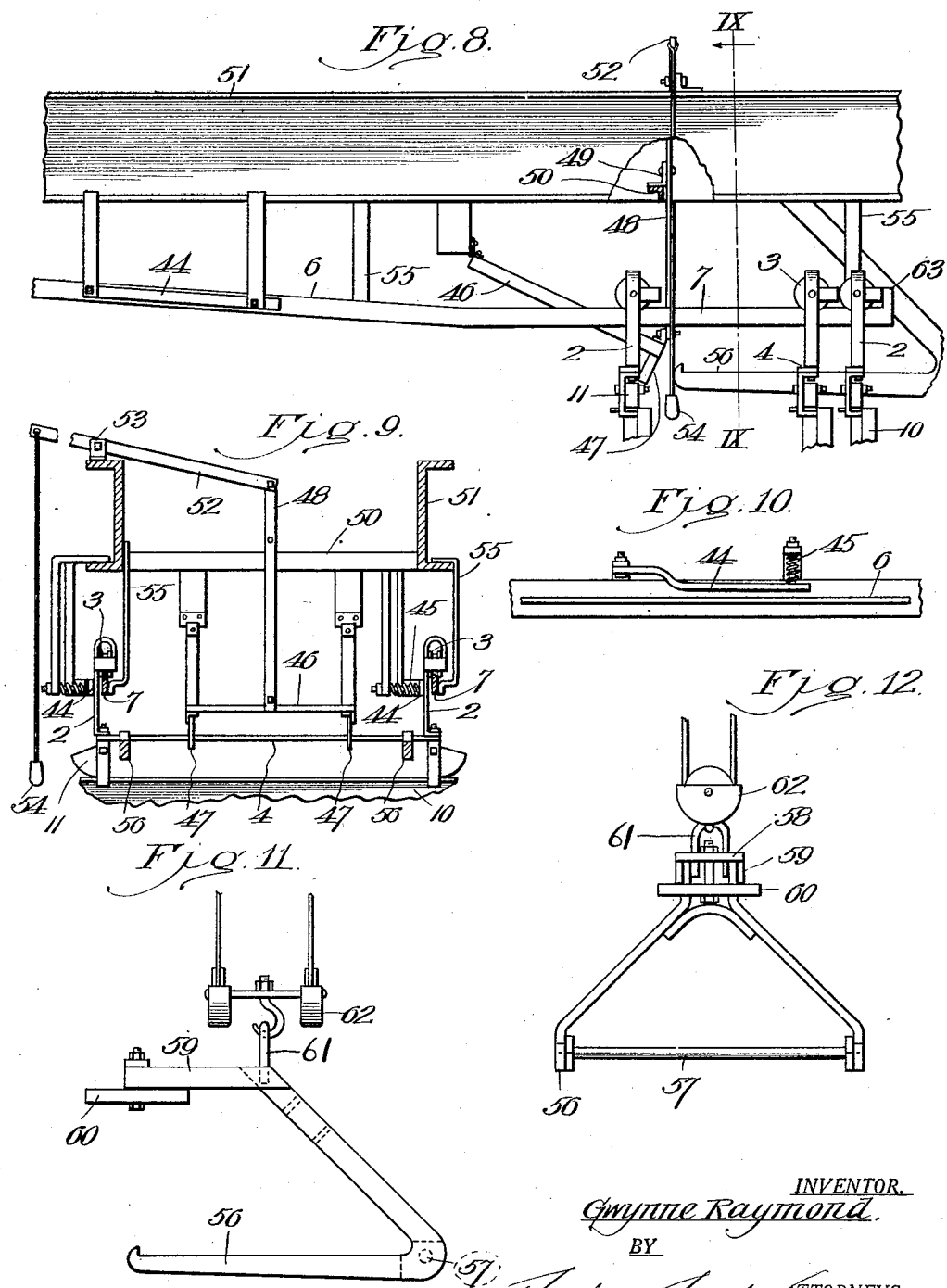

Patented July 5, 1932

1,865,788

UNITED STATES PATENT OFFICE

GWYNNE RAYMOND, OF KANSAS CITY, MISSOURI

CONVEYER SYSTEM

Application filed June 22, 1928. Serial No. 287,417.

This invention relates to conveyer or painting systems and has for its object to provide in combination with a main conveyer track, a series of branch tracks on which loaded conveyers may be automatically directed and permitted to hang while the paint of freshly painted devices carried by said conveyers is permitted to dry, or if desired the branch tracks may comprise storage tracks only.

Another object of the invention is to provide constantly driven conveyer mechanism with means whereby suitable wheeled conveyers, to which steel plates or the like have been detachably suspended, may be elevated and automatically loaded on a gravity loading track and released in timed relation onto a main conveyer track where they are picked up by constantly driven operating mechanism and propelled to the storage tracks.

A further object of the invention is to provide novel crane hooks for automatically placing the loaded conveyer trolleys on the loading track; as well as unloading crane hooks for removing loaded conveyers after the material conveyed has had an opportunity to entirely dry or when it is desired to remove the material for any purpose.

With the general objects named in view and others as will hereinafter appear, the invention consists in certain novel and useful features of construction and combinations of parts as hereinafter described and claimed; and in order that it may be fully understood, reference is to be had to the accompanying drawings, in which:

Figure 3 is a front elevation of the timing mechanism to control the advance of the loaded conveyers from the loading track onto the main track.

Figure 4 is a section on the line IV—IV of Figure 3.

Figure 5 is a section on the line V—V of Figure 3.

Figure 6 is a diagrammatic view of the entire system as used in connection with a pair of paint spray booths.

Figure 7 is a top plan view of an automatic switch mechanism whereby the conveyers may be guided off the main track onto a pair of parallel storage tracks.

Figure 8 is a side elevation of the end of a pair of storage tracks, a series of conveyers on said tracks, and an unloading crane hook in cooperative relation thereto.

Figure 9 is a section on the line IX—IX of Figure 8.

Figure 10 is a fragmental bottom plan view of an automatic brake forming a part of the invention.

Figure 11 is a side elevation of the unloading crane hook.

Figure 12 is a rear elevation of the said hook.

Figure 1:
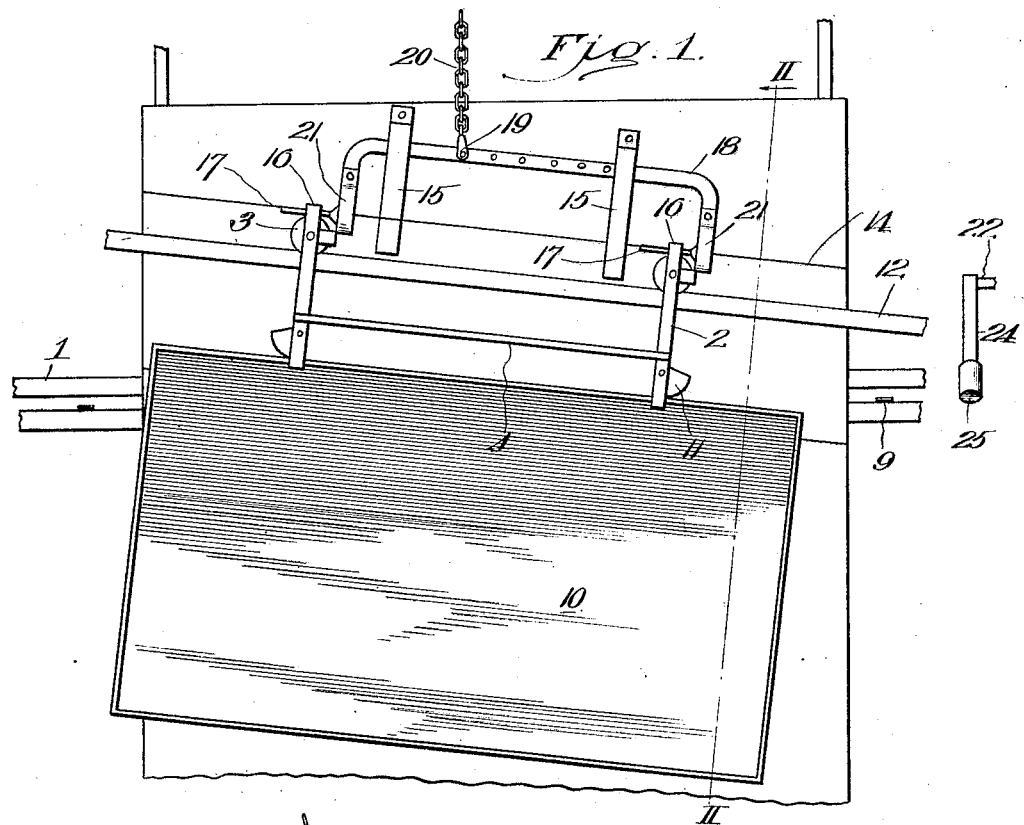
Figure 1 is a front elevation of the loading track, a conveyer and a loading crane hook.

In the said drawings, where like reference characters identify corresponding parts in all of the figures, 1 indicates an overhead conveyer track on which conveyers 2, comprising a pair of suspension straps and grooved trolley wheels 3 arranged in spaced relation by a spacer bar 4 which has a swivelled connection with each trolley, are adapted to travel with the trolleys arranged in tandem relation. The main track communicates by means of automatic switches 5 and manual switches 5a with a series of spaced storage tracks 6 arranged in pairs at distances apart as determined by the length of the spacer bars 4, said storage tracks being pitched at an angle for gravitative travel of the conveyers and preferably terminating in horizontal portions 7 (Figure 8) for a purpose which will hereinafter appear, or if desired, they may be provided with constantly driven mechanism to propel the conveyers.

The conveyers 2 are propelled along the main track 1 by spaced operating arms 8 projecting from a constantly driven chain or cable 9 of any suitable character, said arms contacting with one of the trolleys 3, it being of course understood that an article 10, such as a steel plate will be detachably suspended from each conveyer by suitable devices such as safety hooks 11 described and claimed in my copending application for patent filed March 19, 1928, Serial No. 262,950.

At a loading point a loading track 12 is connected to the main track 1 by a suitable switch 13. To insure the proper positioning of the grooved trolley wheels 3 on said track after they have been elevated as shown in Figure 1, the loading track is provided with a buffer or bumper 14 extending angularly rearwardly and upwardly from the rear side of the track and below the same a distance slightly greater than the depth of the groove in the wheel and overlying the loading track and then either integral therewith or as a separate member is bent downwardly and rearwardly to constitute a fender 14$^a$ preferably terminating in a vertical portion 14$^b$ extending to the floor level; and above buffer 14 are a pair of downwardly and outwardly extending guide arms 15, which extend outwardly beyond the loading track.

Figure 2:
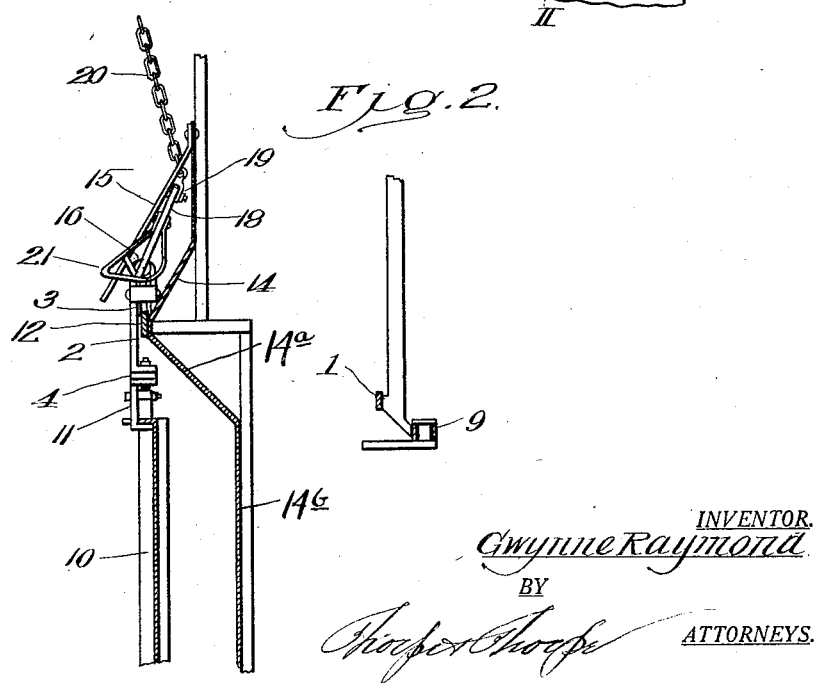
Figure 2 is a section on the line II—II of Figure 1.

The trolleys which are of common and well known form in which the strap is bent to provide a return bend 16 above the grooved wheel, are each engaged by a horn 17 projecting in the same direction from the opposite extremities of a relatively inverted U-shaped loading hook 18, which is pivotally suspended off center as at 19 by a chain 20 extending from an overhead hoist (not illustrated), so that the angle of inclination shall substantially conform to the pitch of the loading track to insure practically simultaneous seating of the trolley wheels. The center of pull exerted by the chain is at a point between the ends of the projecting guide arms 15 and the loading track 12 (see Figure 2) so that upon upward lift imparted by the chain, the U-shaped hook 18 will be guided by fender 14$^a$—14$^b$ around the track and will finally be engaged by the arms 15 and pushed or directed inwardly across the vertical plane of the track 12, the pulleys 3 at this time resting upon the inclined buffer 14, after having been guided across the track by the arms 15. The hoist is now lowered and the grooved pulley wheels 3 automatically find their seats on the loading track. Each end of the U-shaped hook 18 is provided with a guide shoe 21 so that after the hook is lowered it will ride over the track 12. In other words, the hook has no projecting portions to catch on any part of the loading apparatus.

After a conveyer has been loaded as above described, further slacking of the elevating chain 20 will engage the horns with the upper peripheries of the trolley wheels, the weight of said hook being imposed thereon and simultaneously therewith the trolleys commence to move by gravity along the loading track to the right as shown in the drawings. This rolling of the wheels forces the horns 17 to the right until they pass out of the loops 16 thus entirely freeing the loading apparatus which falls downwardly ready for further operation.

As heretofore stated, the drive arms 8 of the constantly driven chain 9 are fixed as to their distances apart, this distance being determined so as to properly space the devices 10 as closely as possible without interference along the drive chain 9. It was, therefore found desirable to provide means to insure that each loaded conveyer 2 should move onto the main track 1 just ahead of a driven arm 8, so that the devices shall not become jammed or bunched and interfere with the proper operation of the mechanism.

In order, therefore, to release the conveyers for movement onto the main track in timed relation to the speed of the drive chain, a shaft 22 is journaled in bearings 23 and extends substantially parallel to and is spaced from the loading track 12, said shaft being formed at one end with a stop arm 24 having an anti-friction roller 25 in the path of travel of the spacer bars 4 of the conveyers 2 (Figures 3 to 5 inclusive), the other end of said shaft 22 being equipped with a weighted arm 26 so arranged that the device, except when operated as below described, will always maintain such a position that the stop intercepts the path of travel of the spacer bars. To protect the mechanism against shock, the shaft 22 is encircled by a coiled spring 27 which presses at one end against a collar 28 on the shaft, and at its other end against one of the fixed suspended bearings 23 of the shaft, as illustrated.

The stop 24 is released so that a conveyer may travel by gravity onto the main track in timed relation to a travelling finger or pusher by means of an anti-friction wheel 29 journaled on the end of a lever 30 pivoted to a ceiling support 31, said wheel being in the path of travel of the propelling arms 8. When an arm 8 strikes said wheel it moves the same and consequently the lever 30 to the right. Secured to the lever 30 is a link 32 having its opposite end connected to a crank lever 33 pinned or otherwise secured to a transverse shaft 34 provided at its opposite end with an arm 36 carrying a swivel or universal joint 37 to which is secured an operating arm 38. The operating arm 38 is received between the bifurcated ends of a crank arm 39 rigidly secured to the shaft 22, said bifurcated end carrying a cross pin 40 extending through a curved operating slot 41 in the arm 38.

With this construction it will be evident that upon upward swinging movement of the lever 39 as effected by movement of the roller wheel 29, the shaft 22 will be rotated a sufficient distance to withdraw its stop 24 out of the path of travel of the cross bar of the conveyer 2 (see Figure 5). The conveyer immediately advances by gravity and when the arm 8 releases the mechanism by passing beyond roller wheel 29, all of the mechanism returns to normal position except the shaft 22 and its connected parts which will be limited in their return through contact of the roller 25 with the edge of the spacer bar 4. The slot 41 accommodates this movement and thus relieves the conveyer of any greater side stress than that imposed by the weighted arm 26 of the shaft 22. After the conveyer has passed by, the stop returns to normal position ready for further operation.

The conveyers are thus automatically fed to the main track 1 and are each pushed or propelled by an arm 8 through suitable paint booths or the like 42 until they attain and are guided by manual and automatic switches 5a and 5 respectively, such as shown in my copending application filed August 1, 1927, Serial No. 209,802, at which time the pair of trolley wheels 3 are each guided onto one of a pair of spaced storage tracks 6, said tracks being pitched downwardly (see Figure 8) so that the conveyers will gravitate away from the main track, or they may be provided with any desired overhead drive mechanism such as that illustrated as cooperating with the main track. It will be understood that there is no selective mechanism to automatically guide the conveyers onto a predetermined pair of branch tracks, but that every conveyer goes onto the same pair of branch tracks in accordance with the setting of the manual switches 5a.

To check the speed of the conveyers each track 6 is provided with a brake 44 extending parallel to the track and spaced such a distance that the brakes will exert friction on the straps of the trolleys under the pressure of expansion springs 45 (see Figure 10). The storage tracks are also provided with pivoted frames 46 carrying a pair of stops 47 normally in the path of travel of the spacer bars 4 to catch and retain the conveyers so that they may be released in plurality in accordance with the number the unloading crane hook is designed to unload, for further travel downwardly on the unloading sections of the storage tracks. The mechanism for effecting upward movement of the pivoted frame 46 and the withdrawal of the stops 47, comprises a vertical member 48 provided with a stop 49 to limit downward swinging movement of the frame through contact with a cross member 50 between beams 51 by which the tracks 6 are suspended, the upper end of said member 48 being pivoted to the end of an operating lever 52 pivoted intermediate its length as at 53 and provided with any suitable operating handle 54. Upon reference to Figure 9 it will be noted that the tracks 6 are suspended from the beams 51 by side brackets 55 secured to the same sides of the tracks so that the hangers or straps of the conveyers shall be free for removal to the left.

In order to unload the conveyers an unloading crane hook is provided which comprises a pair of spaced horizontal arms 56 having their rear ends braced by a cross bar 57 and then converging upwardly and forwardly (see Figure 11) and being secured at their upper ends to a cross bar 58. A pair of forwardly projecting arms 59 project from cross bar 58 and carry a weight 60 to effect balancing of the structure on its supporting yoke 61. With this construction the crane hook is balanced and will always maintain a horizontal position when lifted by any suitable lifting blocks 62 suspended from a hoist, not shown. To remove the loaded conveyers the hook is positioned with its arms 56 below the spacer bars 4 while the conveyers are on the storage tracks and a plurality of said conveyers, the number depending upon the length of the arms, are elevated sufficiently high for the trolley wheels 3 to pass over fixed stops 63 at the ends of the tracks, or if desired the load is lifted only high enough for the flanged wheels to clear the track, is swung slightly to the left and then is withdrawn longitudinally.

It is believed the construction and operation has been so described that recapitulation is unnecessary. While I have described and claimed the preferred embodiment of the invention, I reserve the right to make all changes properly falling within the spirit and scope of the appended claims.

I claim:

1. An overhead conveyer loading track adapted to support wheeled conveyers, and a buffer bearing an angular relation to said track, said buffer and track being so related as to insure proper positioning of a conveyer.

2. An overhead conveyer loading track adapted to support a wheeled conveyer, a buffer bearing an angular relation to said track, an elevating hook, and guide arms extending from said buffer and cooperating with the hook and buffer in loading a conveyer on said track.

3. An overhead inclined conveyer loading track adapted to support wheeled conveyers, and a buffer bearing an angular relation to said track, said buffer and track being so related as to insure proper positioning of a conveyer.

4. A hook for wheeled conveyers comprising an inverted U-shaped member, and a pair of longitudinally alined horns projecting in the same direction from the ends of said hook.

5. A loading hook for wheeled conveyers comprising a relatively inverted U-shaped member pivotally suspended off center.

6. A loading hook for wheeled conveyers comprising a relatively inverted U-shaped member pivotally suspended off center, and a pair of longitudinally alined horns projecting in the same direction from the ends of said hook.

In testimony whereof I affix my signature.

GWYNNE RAYMOND.